United States Patent [19]
Dana et al.

[11] Patent Number: 5,653,349
[45] Date of Patent: Aug. 5, 1997

[54] OFFSET STUD FASTENER

[75] Inventors: William D. Dana, Norton; Steve Subichin, Akron, both of Ohio

[73] Assignee: Akro-Mils, Akron, Ohio

[21] Appl. No.: 507,037

[22] Filed: Jul. 31, 1995

[51] Int. Cl.⁶ .................. A47B 43/00; A47B 57/48
[52] U.S. Cl. .................. 211/189; 211/190; 211/192; 248/221.12; 403/315; 403/353
[58] Field of Search .................. 211/189, 192, 211/193; 248/221.11, 221.12, 222.14; 403/353, 319, 315, 316

[56] References Cited

U.S. PATENT DOCUMENTS

| | | |
|---|---|---|
| 1,958,497 | 5/1934 | Rivers . |
| 2,133,781 | 10/1938 | Johnson . |
| 2,157,309 | 5/1939 | Enoch et al. . |
| 2,246,457 | 6/1941 | Schultz . |
| 2,626,773 | 1/1953 | Brackman . |
| 2,733,073 | 1/1956 | Dunham . |
| 3,179,367 | 4/1965 | Rapata . |
| 3,180,606 | 4/1965 | Sabin et al. . |
| 3,235,219 | 2/1966 | Green . |
| 3,273,720 | 9/1966 | Seiz .......................... 211/192 |
| 3,303,937 | 2/1967 | McConnell .................. 211/192 |
| 3,351,212 | 11/1967 | McConnell .................. 211/192 |
| 3,392,848 | 7/1968 | McConnell et al. ........... 211/192 |
| 3,512,653 | 5/1970 | Erismann ..................... 211/192 |
| 3,545,626 | 12/1970 | Seiz .......................... 211/192 |
| 3,804,358 | 4/1974 | Gunther . |
| 3,880,396 | 4/1975 | Freiberger et al. . |
| 3,986,318 | 10/1976 | McConnell . |
| 4,131,204 | 12/1978 | Jacoby et al. ............... 211/192 |
| 4,140,414 | 2/1979 | Buttgereit . |
| 4,258,464 | 3/1981 | Ullman, Jr. . |
| 4,496,061 | 1/1985 | Highsmith ................... 211/191 |
| 4,537,379 | 8/1985 | Rhoades . |
| 4,860,905 | 8/1989 | Schott et al. . |
| 4,904,110 | 2/1990 | Klein ........................ 211/192 X |
| 4,955,743 | 9/1990 | King ......................... 211/192 X |

*Primary Examiner*—Leslie A. Braun
*Assistant Examiner*—Donald J. Wallace
*Attorney, Agent, or Firm*—Oldham & Oldham Co., LPA

[57] ABSTRACT

An article or an assembly comprising first and second structural members, and a plurality of offset stud fasteners securing the first and second structural members together. The first structural member preferably comprises a pair of spaced, channel-shaped uprights, each having a plurality of like-oriented, elongated openings therein, wherein each opening has a circular first or upper portion, a circular second or lower portion of smaller diameter than that of the first portion, and a keyway of restricted width connecting the first and second portions. The second structural member has therein a plurality of longitudinally extending openings, each having an upper portion and a lower portion which is larger than the upper portion. The assembly further comprises a plurality of offset stud fasteners, each having a circular head, a shank comprising a cylindrical first portion and an oblong neck portion of restricted width having spaced parallel flat sides and arcuate ends, and a base member of large size than said shank and projecting from an end of said shank which is opposite from the head. To secure the first and second structural members together, a plurality of offset stud fasteners are inserted into respective openings in the first structural member, the head of the fastener being inserted in any orientation into the larger portion of the opening in the first structural member, then rotated once to align the side surfaces of the neck of the fastener so as to pass through a middle portion of restricted width in said elongated opening, and then rotated a second time to locking position.

14 Claims, 5 Drawing Sheets

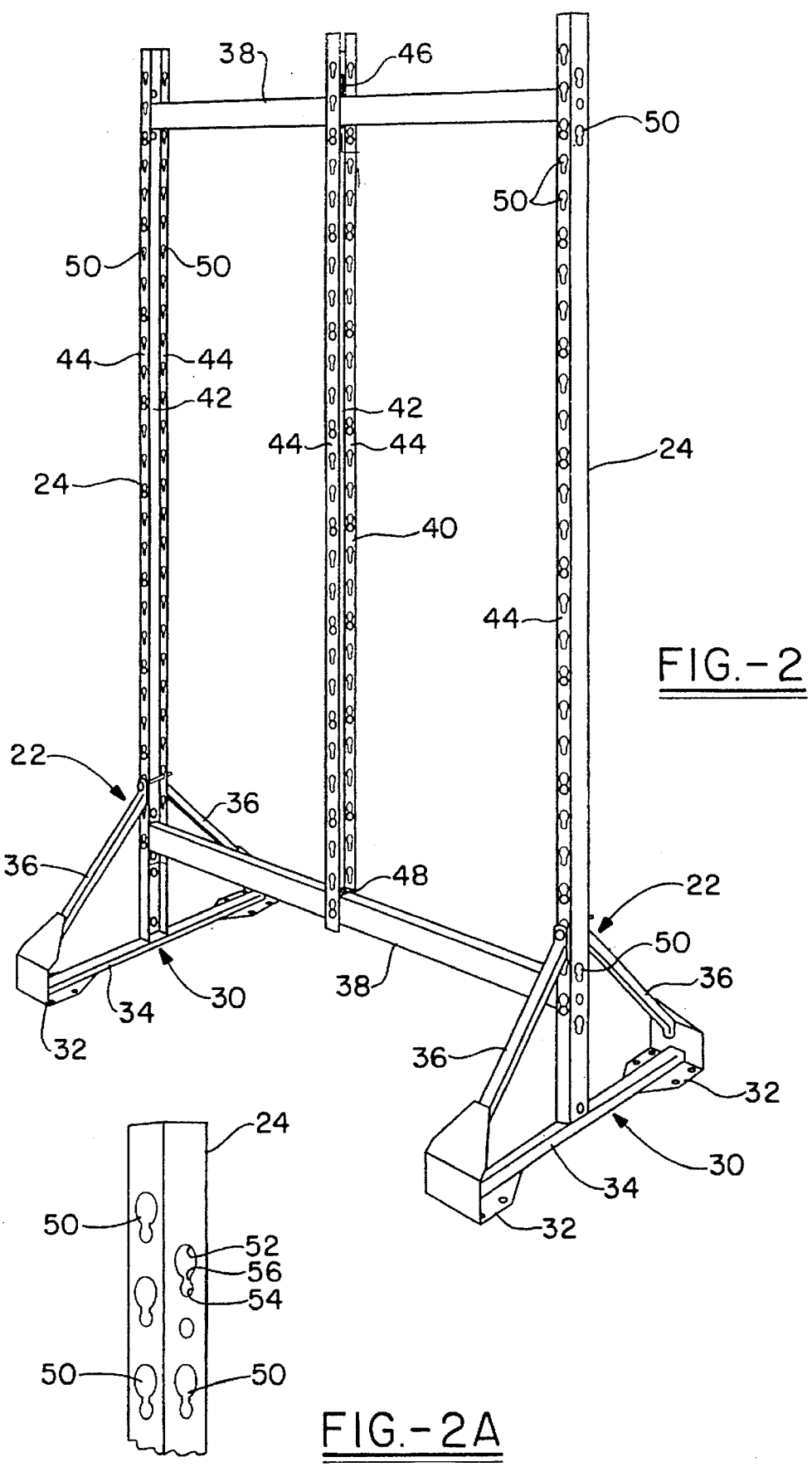

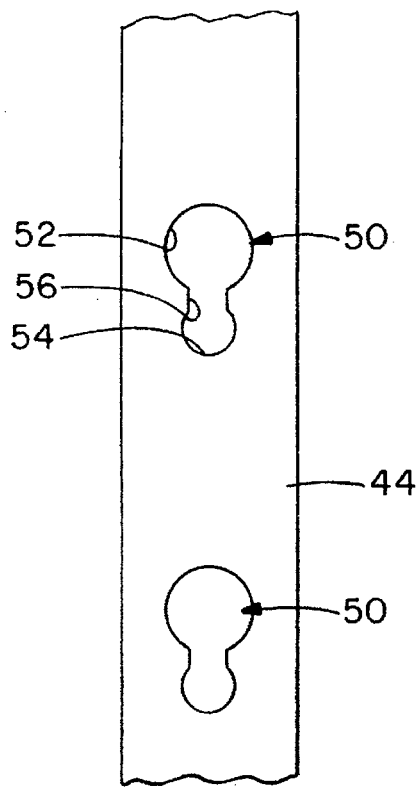
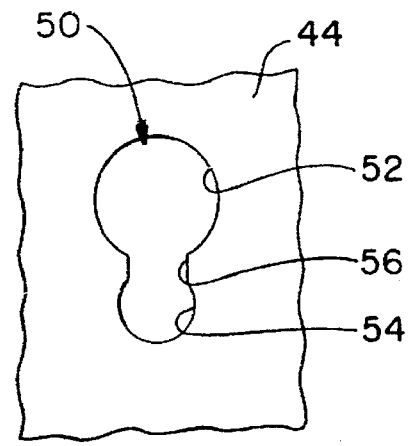
FIG.-4
FIG.-3
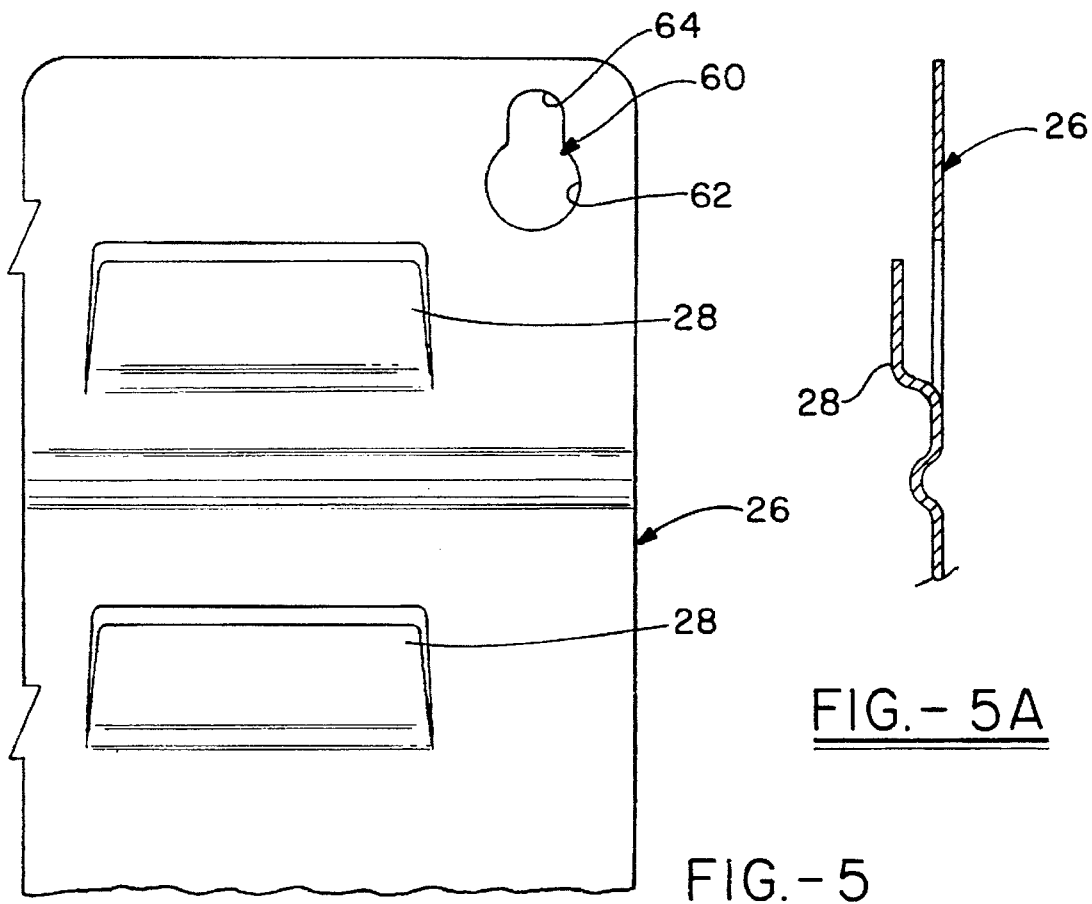
FIG.-5A
FIG.-5

OFFSET STUD FASTENER

TECHNICAL FIELD

This invention relates to fasteners and to structural assemblies which are secured together with fasteners. More particularly, this invention relates to offset stud fastener which enables a pair of rigid structural members to be secured together without the use of bolts or tools.

BACKGROUND ART

Various types of fasteners for joining together two structural members, as for example for joining a panel to a support, are known. Numerous examples of assembled structures which are joined together by fasteners are also known. For example, such assembled structures (or assemblies) include sheet metal book cases, sheet metal display and storage racks, and refrigerators in which shelves are secured to an interior wall.

There is a need for a fastener which will permit quick assembly of two structural members without the use of bolts or tools, and which can be locked in assembled position.

SUMMARY OF INVENTION

This invention according to one aspect provides a stud fastener for securing a pair of structural members together, wherein the stud fastener comprises a head; a shank extending axially in one direction from the head, the shank having a neck portion of reduced cross-sectional width and having a cross-sectional length greater then the cross-sectional width; and a base member affixed to the shank and spaced from the head, and being larger than the shank in at least one direction transverse to the axis of the shank.

The invention according to another aspect provides an assembly comprising a first structural member (or support structure) comprising a rigid sheet having a plurality of like oriented elongated openings therein; a second structural member (or support structure) adapted to be secured to the first structural member, said second structural member comprising a rigid sheet having a plurality of key-hole shaped openings therein; and a stud fastener for securing said first and second structural members together. The stud fastener is as described in the preceding paragraph. Each elongated opening in the first structural member comprises first and second portions at opposite ends thereof, and a third portion of restricted width connecting the first and second portions. The first portion of each elongated opening is wider than the second portion and wide enough to allow the head of the stud fastener to pass through. The second portion is wide enough to receive the shank but too small to allow either the head or the base portion of the stud fastener to pass through. The third portion is narrower than either the first or second portion and has a width which is greater than the cross-sectional width but less than the cross-sectional length of the neck portion of the shank, whereby the stud fastener can pass through the third portion in Oone orientation and can be turned to a second orientation for locking when the stud fastener is positioned so that its shank is received in the second portion of the elongated opening.

BRIEF DESCRIPTION OF THE DRAWINGS

In the drawings:

FIG. 2 is a perspective view, similar to FIG. 1, with all panels removed so that only the support structure is shown.

FIG. 2a is a fragmentary view of a portion of the structure shown in FIG. 2, illustrating the shape of elongated openings in the support structure for receiving fasteners in accordance with this invention.

FIG. 3 is an end view of an upright rail which forms part of a support structure according to this invention, showing in detail the shape of the elongated opening therein for receiving fasteners.

FIG. 4 is a fragmentary view of a portion of the upright rail of FIG. 3, shown on a still larger scale for illustrating the shape of a typical elongated opening for fasteners.

FIG. 5 is a front elevational view on a larger scale of the panel shown in FIG. 1.

FIG. 5a is a partial cross-sectional view of the panel of FIG. 5.

DESCRIPTION OF PREFERRED EMBODIMENTS

This invention will now be described in further detail with particular reference to the best mode and preferred embodiments thereof.

Figure 1:
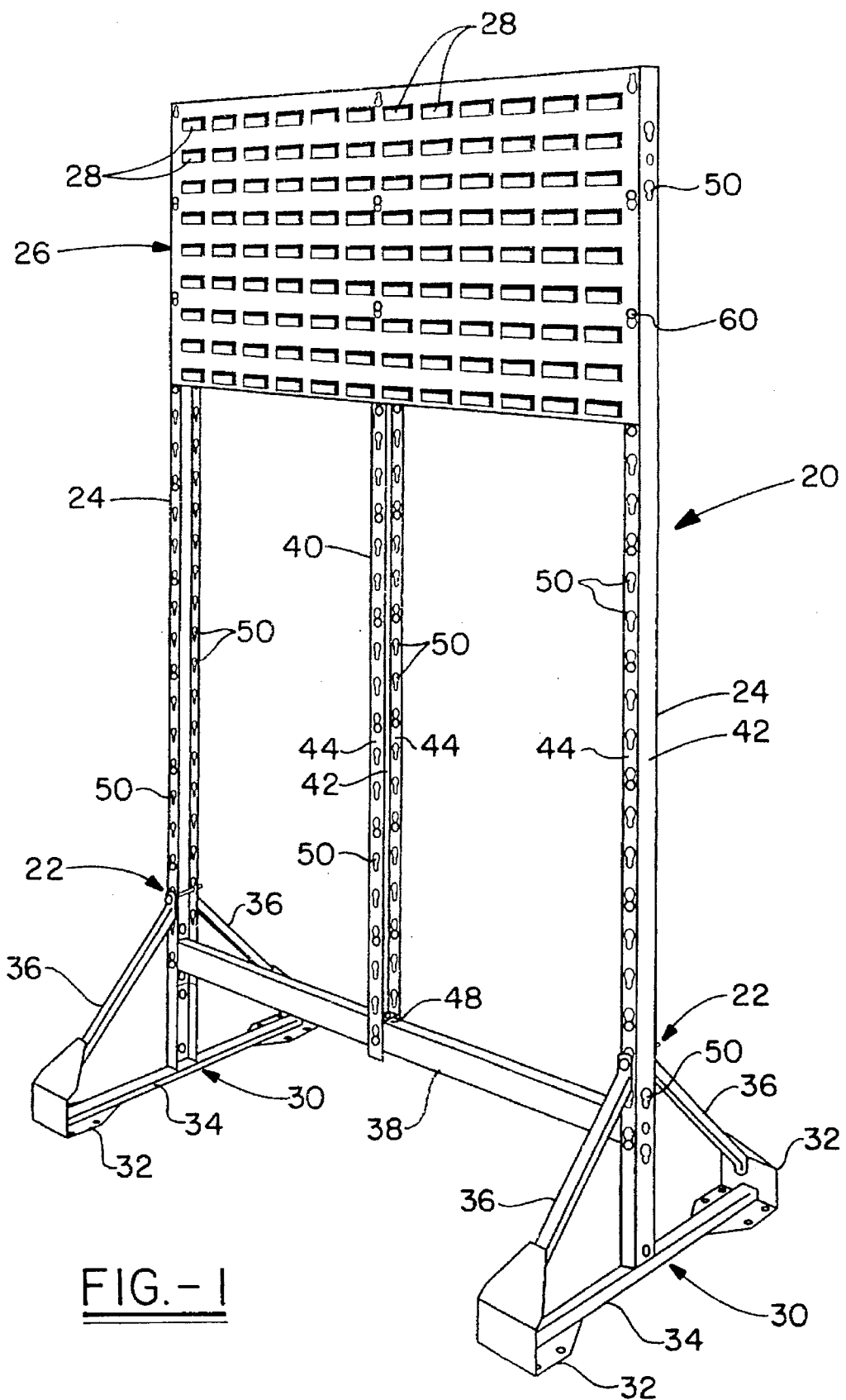
FIG. 1 a perspective view of an assembly according to this invention, in this case a bin rack comprising a plurality of panels supported on upright rails, in which all storage bins and all panels except one have been removed for purposes of illustration.

FIG. 1 shows an assembly as a whole in accordance with the present invention. A bin rack has been chosen for the purpose of illustration. However, from what has already been said, it is evident that the present invention is applicable to any article which requires some assembly by the user.

An assembly 20 as a whole, here illustrated as a bin rack, comprises a first structural member or support member, here illustrated as a rack 22 which includes a pair of channel-shaped uprights 24, and at least one second structural member or supported member 26, here illustrated by a louvered panel 26 having a plurality of louvers 28, each of which is capable of supporting a bin (not shown) for holding small articles, such as bolts, screws, washers, nuts and the like.

The assembly (or assembled article) 20 actually contemplates a plurality of panels 26 (typically three) arranged one above the other. Only one such panel is shown in FIG. 1 so that the support structure 22 can be shown in greater detail.

The first structural member or rack 22 will be described with particular reference to FIG. 2. Referring to FIG. 2, the rack 22 comprises a pair of uprights 24 (already mentioned)

and a pair of spaced-apart bases 30. The uprights 24 support panels 26 along their side edges, and may therefore be termed edge uprights or outside uprights. Each base 30 supports one upright. Each base 30 comprises a pair of feet 32, a horizontal strut 34, and a pair of angled support braces 36 which extent diagonally upwardly from respective feet 32. The horizontal strut 34 and the two angled braces 36 of each stand 30 together support an upright 24. The lower end of each upright so supported rests on a horizontal strut 34. The first structural member or support structure 22 further includes a pair of horizontal braces 38, one near the bottom and the other near the top of the assembly 20. The bottom brace 38 is shown in both FIG. 1 and FIG. 2; the top brace is hidden in FIG. 1 but shown in FIG. 2. The ends of cross braces 38 are joined to the two outside uprights 24 by means of the offset stud fasteners of the present invention as will be described in greater detail later. A third upright 40, midway between the two outside uprights 24, is provided for increased structural strength and rigidity and is joined to the two horizontal cross braces 38.

Each of the two outside uprights 24, and the center upright 40 are channel shaped, comprising a web 42 and a pair of flanges 44, which intersect the lateral edges of the web 42 at right angles and extend in the same direction from the web so as to form a U-shaped or channel-shaped structure.

The center upright 40 has an opening 46 in its web 42 near the upper end thereof to allow the top cross brace 38 to pass through. In addition, the bottom edge of this opening helps to support the top brace 38. A bottom portion of the web 42 of center upright 40 is removed (at 48) to allow the bottom brace 38 to pass through.

Stands 30 and cross braces 38 make a free standing support structure 22 possible. If desired, a pair of uprights 24 may be anchored to a vertical wall to provide a support structure for panels 26.

Both flanges 44 of each of the uprights 24 and 40 are provided with a plurality of like and like-oriented elongated openings 50 arranged in a single vertical row. This is shown in FIGS. 1, 2, 2a, and 3. The shape of an individual elongated opening 50 is best seen in FIG. 4.

Referring now to FIGS. 3 and 4, especially FIG. 4, each elongated opening 50 has a vertical longitudinal axis and comprises a first portion 52 and a second portion 54 at opposite ends thereof, and a third portion 56 of restricted width connecting the first and second portions. The first portion 52 is wide enough to allow a head of a stud fastener of this invention to extend through it. The second portion 54 is smaller in width than the first portion 52; the second portion is of sufficient width to permit the neck of a fastener to pass therethrough but too narrow to permit the head of the fastener to pass through. The third portion 56 is a passageway of restricted width, narrower than either of the first or second portions, and is only wide enough to permit a neck portion of a stud fastener of this invention to pass through in one orientation but not in a second orientation which is transverse to said one orientation. In the preferred embodiment shown, the first and second portions 52 and 54, respectively, are both circular in shape. The third portion 54 is a key way of short axial length connecting the first and second portions. However, it is not necessary that the restricted opening provided by this third portion have any axial length at all. While the structure shown is preferred, it is possible for circles forming the first and second portions 52 and 54, respectively, to intersect and overlap instead of being spaced as shown, so that the third portion 56 of restricted width is simply a neck at the intersection of two overlapping circles.

All of the elongated openings 50 in a vertical upright 24 or 40 have the same orientation. The first and largest portion 52 is at the top of the elongated opening; the second portion 54 is at the bottom; and the third portion 56 is in between. Each of the uprights 24 also has two pairs of elongated openings 50, one near the top of the upright and the other near the bottom of the upright for receiving stud fasteners which support cross beams 38.

Both the elongated openings 50 just described and the stud fasteners, which are yet to be described, are specially designed to co-act with each other to provide stud fasteners which can be locked so that first and second structural members 22 and 26, respectively, can be firmly secured together.

Figure 6:
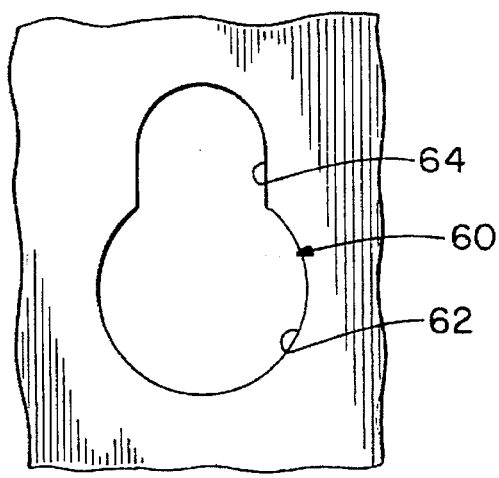
FIG. 6 is a fragmentary view of the panel shown in FIG. 1 on a still larger scale, showing the shape of keyhole openings therein.
Figure 7:
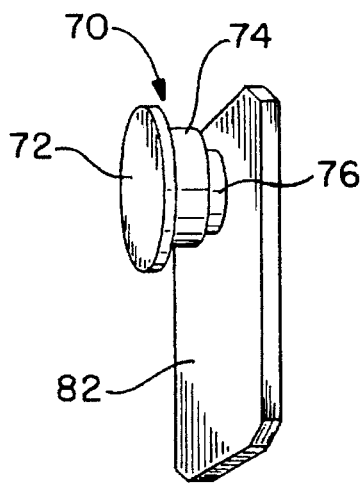
FIG. 7 is a perspective view of an offset stud fastener in accordance with a preferred embodiment of this invention.

Each of the panels 26 has along its side edges a plurality of elongated, generally pear-shaped openings 60, arranged in vertical rows. Each elongated opening 60 comprises a larger portion 62 at the bottom and a smaller portion 64 at the top, i.e., above the larger portions 62. In the preferred embodiment each opening is keyhole shaped, the larger portion 62 of each opening 60 is circular in shape and the smaller portion 64 is in the shape of a slot having parallel sides and a rounded or semi-circular upper end. The shape of opening 60 is shown in FIGS. 5 and 6 and is best shown in FIG. 6.

The preferred stud fastener 70 of this invention will now be described with reference to FIGS. 7 to 10. Referring to FIG. 7 to 10, a stud fastener 70 of this invention is a rigid metallic member having opposite first and second ends and a central axis X—X (see FIG. 9) extending therebetween. All of the stud fasteners are preferably alike in size and shape. As shown in FIG. 9, each stud fastener 70 comprises a head 72, preferably circular, at one end thereof. Extending axially in one direction from the head 72 is a shank, which includes a cylindrical first portion or collar 74 of circular cross section and a second or neck portion 76. Head 72 and the shank are co-axial; the X—X axis (or simply the X axis) is the common central axis of both. The first portion 74 is adjacent to and of smaller diameter than the head 72. The second or neck portion 76 is axially adjacent to the first portion 74 of the shank, and is spaced from head 72. The second or neck portion 76 of the shank comprises a pair of opposite flat sides 78 (which are equi-distant and on opposite sides of the central axis X—X of the stud fastener 70) and a pair of opposite arcuate ends 80. The arcuate ends 80 have a common center, which is the central axis X—X of the stud fastener 70, and a slightly smaller diameter than that of the first portion 74 of the shank.

At the opposite or second end of stud fastener 70, and spaced from head 72, is an offset base member 82. The base member 82 is larger than the shank in at least one direction transverse to the axis of the shank (which is the X axis). The head 72, the shank, and the base member 82 are integrally joined together so that a fastener 70 is a unitary, one-piece structure.

The sides 78 of the neck portion 76 of the shank can be formed by milling. This milling forms a pair of inwardly-extending slots (not numbered) whose inner boundaries are the sides 78. It will be noted that the neck portion 76 is of oblong cross-sectional shape, in which the length measured along a major axis Y—Y between the arcuate ends 80 is greater than the width measured along a minor axis Z—Z from one side 78 to the other side 78. The X, Y, and Z axes (denoted as X—X, Y—Y, and Z—Z, respectively, in the drawings) are mutually orthogonal.

Figure 8:
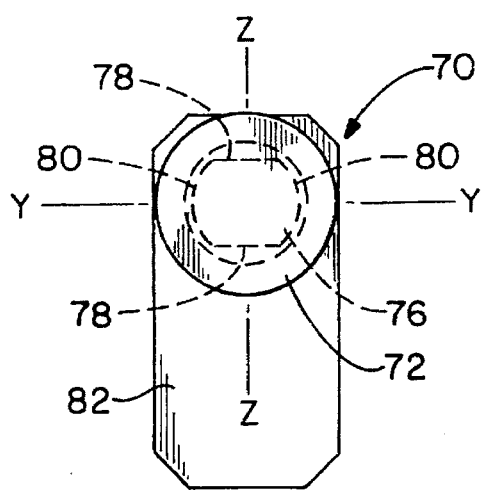
FIG. 8 is a front elevational view of the stud fastener of FIG. 7.
Figure 9:
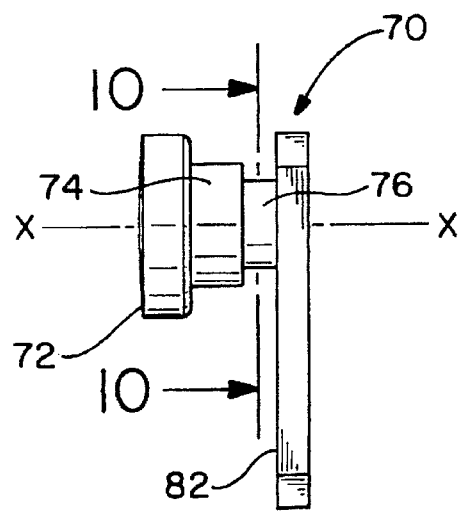
FIG. 9 is a side elevational view of the stud fastener of FIG. 7.
Figure 10:
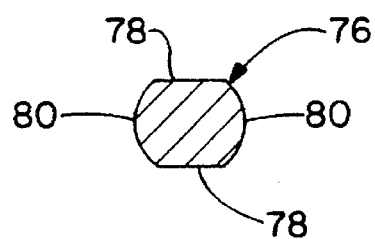
FIG. 10 is a cross-sectional view taken along line 10—10 of FIG. 9, showing the cross-sectional shape of the narrowest or neck portion of the stud fastener of FIG. 7.

A preferred base member 82, shown in FIGS. 8–10, is a thin, rigid metal sheet or plate, generally rectangular in shape, having a length exceeding a width and typically no more than 0.1 inch thick. The corners of base member 82 may be beveled as shown. Base member 82 extends laterally in one direction from the shank (i.e., perpendicular to the central axis of the shank). In contrast to the head 72 and both portions 72 and 76 of the shank, which are axially aligned, the geometrical center (or center of gravity) of the base member 82 is offset from the central axis of the head and the shank. In a particularly preferred embodiment, shown in FIG. 8, the width of base member 82 is equal to the diameter of head 72, and the length of base member 82 is twice the width. The lengthwise direction of the base member 82 and the lengthwise direction of the neck portion 76 of the shank are transverse to each other. As shown in FIG. 8, the Z axis is the longitudinal axis of base member 82 (along which its length is measured) and is also the minor or width-wise axis of neck portion 76. The Y axis (along which the width of base member 82 is measured) is the major or lengthwise axis of the neck portion 76.

The diameter of head 72 of stud fastener 70 is just slightly smaller than the diameter (or more broadly, the width) of the first and largest portion 52 of an opening 50, permitting the head of the fastener to pass through this opening in any orientation with only a slight clearance. The diameter of the first and larger portion 74 of the shank of fastener 70 is just slightly larger than the diameter of the second portion 54 of an elongated opening 50 in an upright 24 or 40 and just slightly smaller than the width of the slotted portion 64 of a keyhole-shaped opening 60 in a panel 26. The semi-circular upper ends of opening 60 in a panel 26 rest on respective first portions 74 of stud fasteners 70 in an assembly (or assembled article) 20. The first and larger portion 74 of each stud fastener is in effect a collar which cannot pass through the second portion 54 of elongated opening 50. Only the neck portion 76 of a stud fastener 70 is small enough to be received in the second portion 54 of an opening 50. The arcuate ends 80 are just slightly smaller in diameter than a second portion 54 of an opening 50. The width of the neck portion 76 of the fastener (the distance between opposite sides 78) affords just a slight clearance with the side edges of the third and narrowest portion 56 of the elongated opening 50. To enable a stud fastener 70 to pass through this restricted opening 56, it is necessary to turn or orient the fastener in one orientation such that the sides 78 of the neck portion 76 of the stud fastener 70 are adjacent to the respective side edges of the third portion or keyway 56 of the elongated opening 50. In other words, the fastener 70 must be oriented so that the Y axis of the fastener (see FIG. 8) is aligned with the longitudinal axis of the elongated opening 50. Stud fastener 70 will pass through the restricted portion 56 in this orientation but will not pass through when the fastener 70 is in another orientation (e.g., such that the Z axis is aligned with the longitudinal axis of opening 50).

The size and shape of the base member 82 enable the base member to achieve two important objectives. First, the base member is large enough so that it cannot pass through either the second portion 54 or the restricted portion 56 of an opening 50. Secondly, because of the offset center of gravity, the base member will automatically rotate the fastener 70 to locking position, in which the flattened sides 78 of the fastener are now transverse to the sides of keyway 56 and to the longitudinal axis of the opening 50 as a whole, once the fastener has been moved through the restricted portion 56 of opening 50 to a position in which the central axis of the fastener is aligned with the center (or central axis) of the second and the smaller circular portion 54 of elongated opening 50. Also, the base 82 and the head 72 of a fastener 70 provide a convenient means for gripping by a user. The user's thumb may grip the base 82, and the user's index finger may grip the head 72.

For the purpose of further illustration, specific dimensions of the openings 50 and 60 which have been found to be useful and preferred will be shown in Table 1, and specific preferred dimensions of the fastener 70 will be shown in Table 2. It is understood that these dimensions are merely illustrative of a preferred embodiment and that they may be varied. All dimensions shown in both tables are in inches.

TABLE I

| DESCRIPTION | INCHES |
| --- | --- |
| Elongated Opening 50: | |
| Diameter of first portion 52 | .531 |
| Diameter of second portion 54 | .312 |
| Width of third portion 56 | .250–.255 |
| Length of third portion 56 | .12 |
| Keyhole Opening 60: | |
| Overall length | .827 |
| Diameter of circular portion 62 | .562 |
| Width of slotted portion 64 | .343 |

TABLE II

| DESCRIPTION | INCHES |
| --- | --- |
| Diameter of Head 72 | .50 |
| Thickness of Head 72 | .125 |
| Diameter of First Shank Portion 74 | .340–.345 |
| Axial Length of First Shank Portion 74 | .140–.145 |
| Diameter (length) of Neck 76 | .295–.305 |
| Width of Neck 76 | .235–.240 |
| Thickness of Neck 76 | .09 |
| Length of Base Member 82 | 1.00 |
| Width of Base Member 82 | .05 |
| Thickness of Base Member 82 | .09 |

It will be noted from Tables 1 and 2 above that the diameter of the head 72 of fastener 70 is just enough smaller than the diameter of the first portion 52 of an elongated opening 50 to allow the head of the fastener to pass through the opening for insertion of the fastener during assembly of the article 20. The diameter of the first portion of shank 74 is slightly larger than that of the second portion 54 of opening 50, but slightly smaller than the width of the slotted portion 64 of the keyhole opening 60 in panel 26. In an assembled article, the first portion 74 of the shank receives and supports the slotted upper portion 64 of keyhole opening 60. The diameter or length of neck 76 is just slightly smaller than the diameter of the second portion 54 of the elongated opening 50, affording a small clearance when an article is assembled. This enables the neck portion of the fastener to rotate in this second portion 54 of opening 50. Finally, the width of neck 76 is just slightly smaller than the width of the third portion or keyway 56 of an elongated opening 50, so that the fastener 70 can pass through the keyway only in an orientation, such that the sides 78 of the fastener are parallel to sides of the keyway 56.

Assembly and a disassembly of an assembled article (or assembly) 20 will now be illustrated with particular reference to FIGS. 11 to 14.

Assembly is as follows: (1) The symmetrical bases 30 are attached to the vertical upright 24 with conventional hex-head bolts, nuts, and lock washers. (2) Four offset stud fasteners 70 are inserted in the elongated openings 50 near the bottom and the top of the webs 42 of upright 24. (3) The bottom cross brace 38 is joined to both vertical uprights 24 at the locations of the fasteners 70. (4) The top cross brace 38 is joined to one vertical upright at the location of the upper set of fastener 70. (5) The fasteners are installed in the bottom opening 50 on either side of the center upright 40. (6) The top cross brace 38 is inserted through the hole 46 and the center upright 40. (7) The bottom of the center upright 40 is swung over the top of the bottom cross brace 38 so that the upright sits across as shown in FIGS. 1 and 2. (8) The top cross brace 38 is attached to the remaining vertical upright 24. (9) The cross braces 38 are attached to the vertical uprights 24 using hex-head bolts, nuts, and washers. (10) The center upright 40 is attached to the top and bottom cross braces with hex-head bolts, lock washers, and nuts. The rack or first structural member 22 is now assembled.

Figure 11:
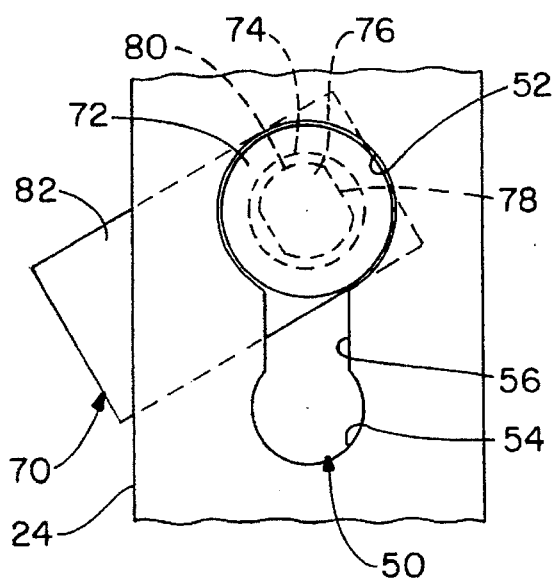
FIGS. 11, 12 and 13 are diagrammatic fragmentary elevational views, on an enlarged scale, illustrating successive steps in the installation of a stud fastener in an elongated opening in a vertical upright.
Figure 12:
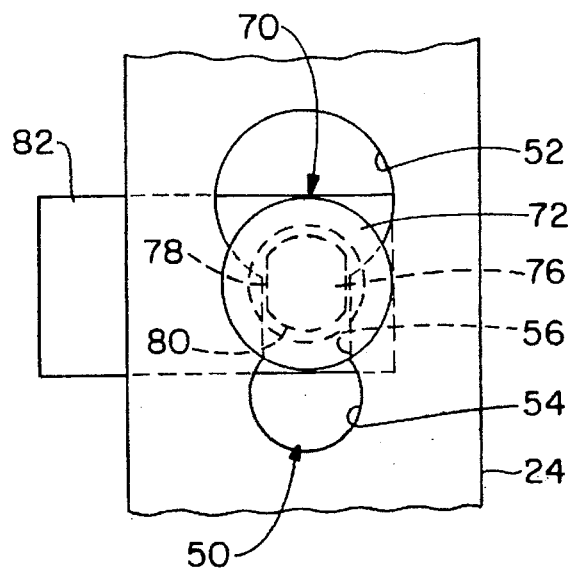
Figure 13:
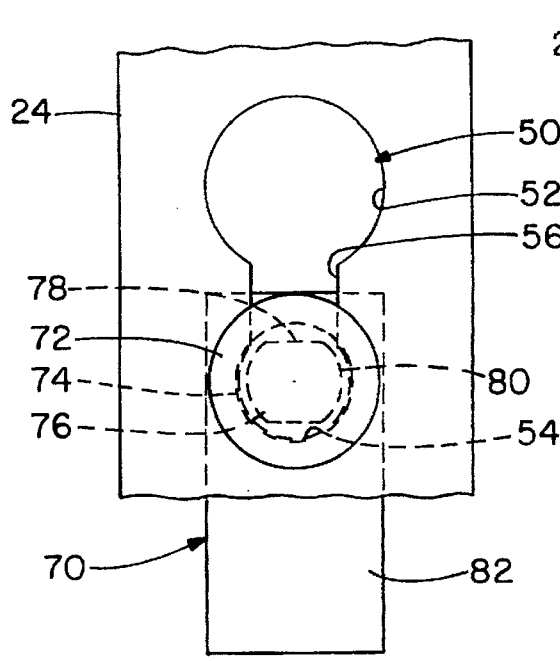

(11) Fasteners 70 are installed in the vertical uprights 24 and 40. Preferably, fasteners are placed every six inches or every third hole, on both sides (both flanges 44) of each upright for a total of nine fasteners for each side of each upright. FIGS. 11, 12, and 13 illustrate successive steps in installation of a fastener in an opening 50 in a vertical upright 24 or 40. To install a fastener 70, the head 72 of the fastener is passed through the upper circular (open fastener) portion 52 of opening 50 in any orientation as shown in FIG. 11. The fastener is then turned so that the sides 78 of the neck 76 are parallel to the side edges of keyway 56. The fastener is then moved downwardly in this orientation until its neck 76 is received in the second or lower portion 54 of the opening 50, as shown in FIG. 2. The base portion 82 by gravity will then turn the fastener 70 a second time into an orientation 90° from the mediate previous orientation, locking the fastener in place. This is shown in FIG. 13.

(12) Beginning of the top of the rack (or first structural member 22), panels 26 are hung from the rack by sliding the keyhole openings 60 in the panels 26 over the fasteners 70. It may be necessary to exert some force combined with a slight downward motion to lock the panel in place. A mallet is recommended if this is necessary. (13) The second and third panels on each side are attached in the same manner. The top of the second panel will overlap the bottom of the first panel, and the top of the third panel will overlap the bottom of the second panel.

Figure 14:
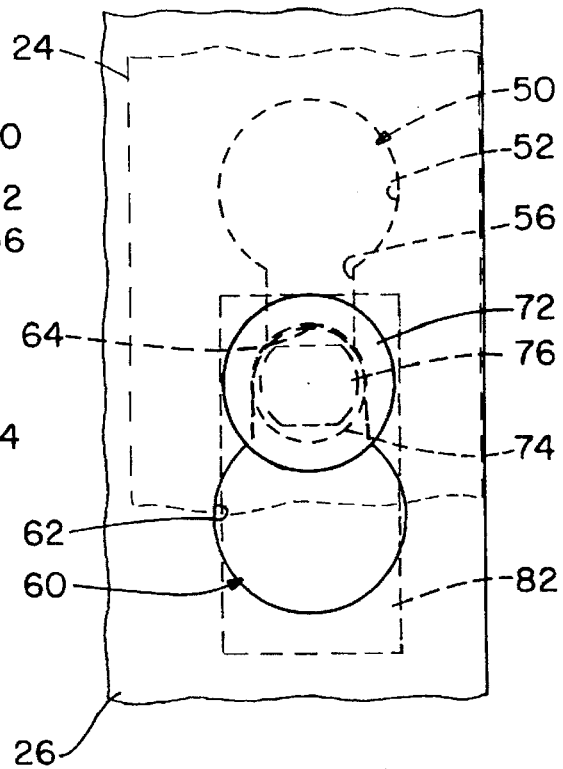
FIG. 14 is an enlarged fragmentary view, similar to FIG. 11 except that the co-acting sheet portions of the first and second structural members are shown in assembled position.

A fragmentary view of a completed assembly 20 according to this invention is shown in FIG. 14. As shown in FIG. 14, the central axis of a fastener is aligned with the center of circular opening 54. The neck portion 76 of the fastener extends through opening 54. The rounded upper portion 64 of keyhole opening 60 in a panel rests on the first portion 74 of a fastener 70. The base member 82 of the fastener projects downwardly, and the sides 78 of the neck portion of the fastener are horizontal, so that the fastener is in locking position, i.e., it cannot pass through the restricted passage way 56 in opening 50 until it is turned 90°.

While the base member 82 is preferably longer than it is wide so that the force of gravity will automatically turn the fastener 70 into locking position, it is possible to provide a square base in place of a rectangular base 82 shown; however, it would then be necessary to turn the fastener manually to locking position. Also, both the uprights 24 and 40 and the panels 26 are preferably vertical so that the force of gravity will turn the fastener to locked position. More broadly, it may be stated that co-acting opposed surfaces of a first structural member or support member (illustrated herein as uprights 24 and 40 ) and of a second structural member or supported member (illustrated herein as panels 26) are preferably vertical or at least inclined. However, the co-acting surfaces can be horizontal if desired.

While this invention has been illustrated with particular reference to a bin rack, it is evident that this invention is applicable to other two-part articles or assemblies in which a second structural member (or supported member) is joined to a first structural member (or support member) by means of fastener. For example, a sheet-metal bookcase having four upright corner posts with elongated openings 50 therein, and a plurality of horizontal shelves having vertical flanges with keyhole openings 60 in the flanges, which are along the four edges of each shelf, may also embody the present invention. Other structures will be apparent to those skilled in the art.

While this invention has been described with particular reference to the best mode and embodiment thereof, it will be apparent to those skilled in the art that variations and modifications can be made without departing from the scope and spirit of this invention.

What is claimed is:

1. A one-piece stud fastener for securing a pair of structural members together, said stud fastener having a central axis, said stud fastener comprising:
   (a) a head;
   (b) a shank extending axially in one direction from said head, said head and said shank being coaxial and having said central axis as a common axis, said shank comprising:
      (1) a first portion axially adjacent to said head and having a diameter, and
      (2) a neck portion axially adjacent to said first portion and spaced from said head,
      wherein said first portion of said shank is smaller than said head, and
      wherein said neck portion has a cross-sectional length and a cross-sectional width, said length being greater than said width but no greater than the diameter of the first portion of the shank, said length being measured along a major axis and said width being measured along a minor axis, and wherein said central axis, said major axis and said minor axis are orthogonal; and
   (c) a base member joined to said shank and remote from said head, said base member extending laterally from said shank in one direction transverse to said central axis and to said major axis of said neck portion, said base member having a center of gravity which is offset from said central axis;
   said fastener being adapted to be rotated between a first orientation required for its receipt in and removal from an elongated opening of a structural member, and a second orientation providing locking engagement.

2. A stud fastener according to claim 1 wherein:
said head is circular in shape and has a diameter, and
said first portion of said shank is cylindrical and of circular cross-section and has a diameter less than that of the head.

3. A stud fastener according to claim 1 wherein said neck portion has opposed parallel flat sides and arcuate ends having a common center, the diameter of said arcuate ends being less than the diameter of the first portion of said shank.

4. A stud fastener according to claim 1 wherein said base member is thin and essentially rectangular in shape and has a longitudinal axis which intersects said central axis at a right angle and extends in one direction therefrom, and wherein said base member has a length measured along said longitudinal axis which is greater than a width measured at a right angle to said longitudinal axis.

5. A stud fastener according to claim 4 wherein said neck portion of said shank has a major lengthwise extending axis which intersects a common central axis of said head and said shank at right angles and wherein further the longitudinal axis of said base member and the major axis of said neck are non-aligned.

6. An assembly comprising:
   (a) a first structural member comprising a rigid sheet having a plurality of like-oriented elongated openings therein;
   (b) a second structural member adapted to be secured to said first structural member by fasteners, said second structural member comprising a rigid sheet having a plurality of longitudinally extended openings therein; and
   (c) a stud fastener for securing said first and second structural members together, said stud fastener having a central axis and comprising:
      (1) a head;
      (2) a shank extending axially in one direction from said head, said head and said shank being coaxial and having said central axis as a common axis, said shank comprising: (i) a first portion axially adjacent to said head and having a diameter, and (ii) a neck portion axially adjacent to said first portion and spaced from said head, wherein said first portion of said shank is smaller than said head, and wherein said neck portion has a cross-sectional length and a cross-sectional width, said length being greater than said width but no greater than the diameter of the first portion of the shank, said length being measured along a major axis and said width being measured along a minor axis, and wherein said central axis, said major axis and said minor axis are orthogonal; and
      (3) a base member joined to said shank and remote from said head, said base member extending laterally from said shank in one direction transverse to said central axis and to said major axis of said neck portion, said base member having a center of gravity which is offset from said central axis;
   wherein each said elongated opening in said first structural member comprises first and second portions at opposite ends thereof and a third portion of restricted width connecting said first and second portions, said first portion being wider than said second portion and being wide enough to allow the head of said stud fastener to pass through, said second portion being wide enough to receive the neck portion of said fastener but too small to allow said head or said base member to pass through, said third portion being narrower in width than either said first or second portion and having a width which is greater than the cross-sectional width but less than the cross-sectional length of the neck portion of the shank, whereby said stud fastener can pass through said third portion when in one orientation but not when in a second orientation transverse to said one orientation and can be turned to said second orientation for locking when said stud fastener is positioned so that its neck portion is received in said second portion of said elongated opening.

7. An assembly according to claim 6 wherein said rigid sheet of said first and second structural members are upright and in facing relationship.

8. An assembly according to claim 7 wherein said elongated opening in said first structural member has a vertical longitudinal axis and said first portion of said elongated opening is at an upper end thereof.

9. An assembly according to claim 8 wherein said longitudinally extending opening in said second structural member has upper and lower ends and comprises a larger portion at said lower end and a smaller portion at said upper end.

10. An assembly according to claim 6 in which said first structural member comprises a pair of spaced, channel-shaped uprights, each of said uprights comprising an elongated web and flanges extending in one direction from opposite side edges of said web, each said flange forming a rigid sheet having elongated openings therein.

11. An assembly according to claim 6 wherein:
   (a) said first structural member comprises a pair of channel-shaped uprights, each of said uprights comprising an elongated web and flanges extending in one direction from opposite side edges of said web, each said flange forming a rigid sheet having a set of like-oriented elongated openings therein, each said elongated opening having an upper end and a lower end, each said opening having a first circular portion at said upper end, a second circular portion at said lower end, said second circular portion being of smaller diameter than said first portion and said third portion, connecting said first and second portions, having a width less than the diameter of said second portion; and
   (b) said longitudinally extend openings in said second structural member extend vertically, each said opening having an upper end and a lower end, said opening being larger at its lower end than at its upper end.

12. An assembly according to claim 6, wherein said stud fastener has a head which is circular in shape and has a diameter, and wherein said shank of said stud fastener is coaxial with said head and has a cylindrical first portion adjacent to the head and having a diameter less than that of said head.

13. A stud fastener according to claim 12 wherein said neck portion has opposed parallel flat sides and arcuate ends having a common center, the diameter of said arcuate ends being less than the diameter of the first portion of said shank.

14. An assembly according to claim 6 wherein said base member is essentially rectangular in shape and has a length and a width, the length being greater than the width.

* * * * *